US006800954B1

United States Patent
Meano

(10) Patent No.: US 6,800,954 B1
(45) Date of Patent: Oct. 5, 2004

(54) SYSTEM AND METHOD FOR PRODUCING ENERGY

(76) Inventor: Brian K. Meano, 505 W. Cherokee, Cleveland, OK (US) 74020

( * ) Notice: Subject to any disclaimer, the term of this patent is extended or adjusted under 35 U.S.C. 154(b) by 286 days.

(21) Appl. No.: 10/150,604

(22) Filed: May 17, 2002

(51) Int. Cl.[7] .................................................. F03B 13/12
(52) U.S. Cl. .............................. 290/53; 290/42; 60/495; 417/330
(58) Field of Search .............................. 290/42, 43, 53, 290/54; 60/495, 497; 417/330, 331

(56) References Cited

U.S. PATENT DOCUMENTS

| 4,009,395 A | | 2/1977 | Long et al. | |
|---|---|---|---|---|
| 4,083,186 A | | 4/1978 | Jackson, Sr. | |
| 4,103,490 A | | 8/1978 | Gorlov | |
| 4,218,192 A | * | 8/1980 | West | 417/333 |
| 4,246,756 A | | 1/1981 | West | |
| 4,398,095 A | * | 8/1983 | Ono | 290/53 |
| 4,583,368 A | | 4/1986 | Neuenschwander | |
| 4,598,211 A | | 7/1986 | Koruthu | |
| 4,754,157 A | * | 6/1988 | Windle | 290/53 |
| 4,883,411 A | * | 11/1989 | Windle | 417/331 |
| 5,186,822 A | * | 2/1993 | Tzong et al. | 210/122 |
| 5,394,695 A | * | 3/1995 | Sieber | 60/398 |
| 5,426,332 A | * | 6/1995 | Ullman et al. | 290/53 |
| 5,842,838 A | * | 12/1998 | Berg | 417/331 |
| 5,872,406 A | * | 2/1999 | Ullman et al. | 290/53 |
| 6,388,342 B1 | * | 5/2002 | Vetterick et al. | 290/53 |

FOREIGN PATENT DOCUMENTS

| DE | 29 07 422 A1 | 8/1980 |
|---|---|---|
| GB | 254394 | 7/1926 |
| JP | 57-73871 | 10/1980 |
| JP | 56-115869 | 11/1981 |

* cited by examiner

Primary Examiner—Nicholas Ponomarenko
(74) Attorney, Agent, or Firm—Fellers, Snider, Blankenship, Bailey & Tippens, P.C.

(57) ABSTRACT

A system and method for producing energy comprising an impoundment area having at least one buoyancy device positioned therein and extending from a pressurization assembly. The impoundment area is preferably positioned with respect to a lifting fluid source such that, by opening an inlet, lifting fluid will flow into the impoundment area to create a rising fluid level and will cause a motive fluid to flow into the pressurization assembly. The lifting fluid can then be removed from the impoundment area to cause the motive fluid to be pressurized. The pressurized motive fluid will preferably be delivered to a fluid turbine.

20 Claims, 4 Drawing Sheets

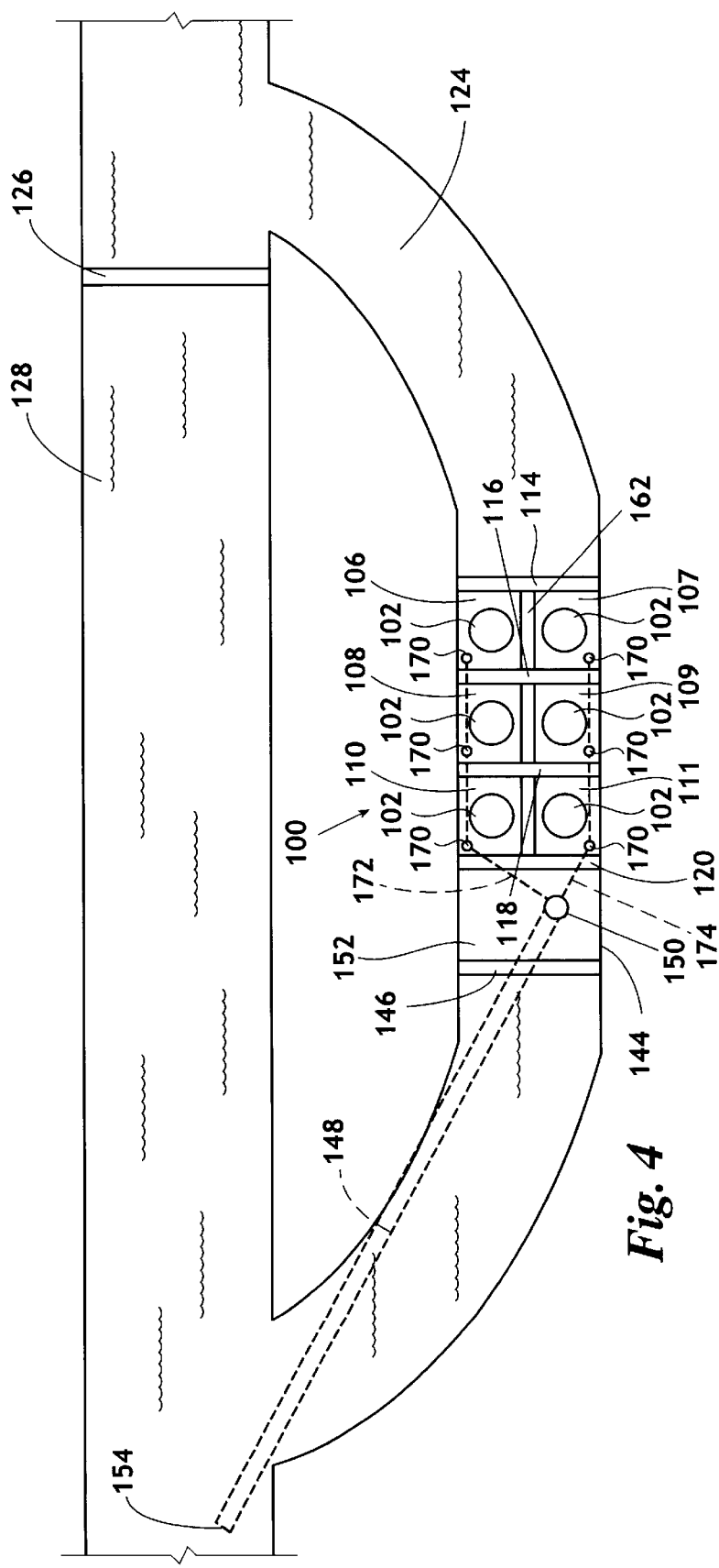
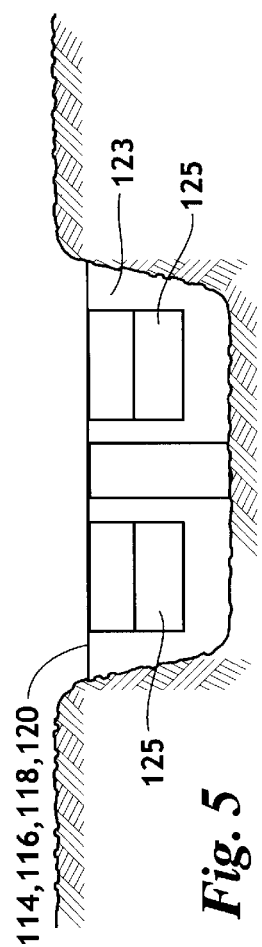
Fig. 4
Fig. 5

SYSTEM AND METHOD FOR PRODUCING ENERGY

FIELD OF THE INVENTION

The present invention relates to energy producing systems and methods. More particularly, but not by way of limitation, the present invention relates to power generation systems and methods in which a kinetic energy source is used to produce efficient potential energy.

BACKGROUND OF THE INVENTION

A continuing need exists for economical, reliable, and efficient systems and methods for producing electrical energy. A need particularly exists for such systems and methods which do not involve the combustion of hydrocarbon or other fuels harmful to the environment.

U.S. Pat. No. 4,218,192 discloses a system for converting wave energy and/or rising and falling tides to electrical power. The system includes: a cylinder located in the ocean, preferably near the shoreline; a piston reciprocatingly positioned within the cylinder; a float which is linked to the piston and which rises and falls with the waves and/or tide; a generator; and a nozzle which emits pressurized fluid from the cylinder to the generator. When the piston is lifted, fluid is drawn into the cylinder. When the water level drops, the piston compresses the fluid within the cylinder for delivery to the generator via the fluid nozzle.

Unfortunately, systems of the type described in U.S. Pat. No. 4,218,192 have significant shortcomings and therefore have not been widely accepted and used. For example, the rise and fall of the tide creates undesirable variations in net head pressure. Further, the pattern and form of the waves acting on the device lack the necessary consistency for steady pressure generation and for synchronous connection to power transmission lines. In addition, the device described can disrupt the tidal habitat.

SUMMARY OF THE INVENTION

The present invention provides a power generation system and a power generation method which satisfy the needs and alleviate the problems discussed above. In addition, the inventive system provides consistent net head pressures, consistent and steady power output, and greater operating pressures than the wave systems known heretofore. The inventive system is also much easier and less costly to construct and places less stress on the surrounding environment. In addition, the inventive system can, for example, be used in conjunction with existing dams to increase power output several fold.

In one aspect, the present invention provides an apparatus for generating power comprising an impoundment area having an inlet. The impoundment area is preferably positioned with respect to a source of a lifting fluid such that the lifting fluid will flow from the source through the inlet. This flow through the inlet will provide a rising level of the lifting fluid in the impoundment area. The impoundment area also includes an outlet through which the lifting fluid can be removed to provide a decreasing level of the lifting fluid in the impoundment area.

The apparatus preferably further comprises at least one pressurization assembly having a buoyancy device positioned in the impoundment area such that the buoyancy device will rise with the rising level and a motive fluid will flow into the pressurization assembly. In addition, the buoyancy device will move downwardly with the decreasing level to cause the motive fluid to be pressurized in the pressurization assembly. The apparatus preferably also comprises a fluid turbine and means for delivering the pressurized motive fluid thereto.

In another aspect, the present invention provides a method for generating power comprising the step of positioning an impoundment area having an inlet with respect to a water source such that, when the inlet is opened, water will flow from the water source into the impoundment area. The impoundment area has at least one buoyancy device positioned therein and extending from a pressurization assembly in a manner so that a rising water level in the impoundment area will raise the buoyancy device and a motive fluid will flow into the pressurization assembly. A decreasing water level in the impoundment area will cause the motive fluid to be pressurized in the pressurization assembly. The impoundment area also has an outlet.

The inventive method preferably further comprises the steps of: opening the inlet to cause said rising water level in the impoundment area and to cause the motive fluid to flow into the pressurization assembly; opening the outlet to produce said decreasing water level in the impoundment area and to cause the motive fluid to be pressurized in the pressurization assembly; and delivering the motive fluid pressurized in the pressurization assembly to a fluid turbine.

Further objects, features, and advantages of the present invention will be apparent to those skilled in the art upon examining the accompanying drawings and upon reading the following detailed description of the preferred embodiments.

BRIEF DESCRIPTION OF THE DRAWINGS

FIG. 4 schematically illustrates an alternative embodiment 100 of the inventive pressurization assembly.

FIG. 5 provides a schematic, elevational front view of a flow gate 114, 116, 118, or 120 employed in inventive power generation system 100.

DETAILED DESCRIPTION OF THE PREFERRED EMBODIMENTS

Figure 1:
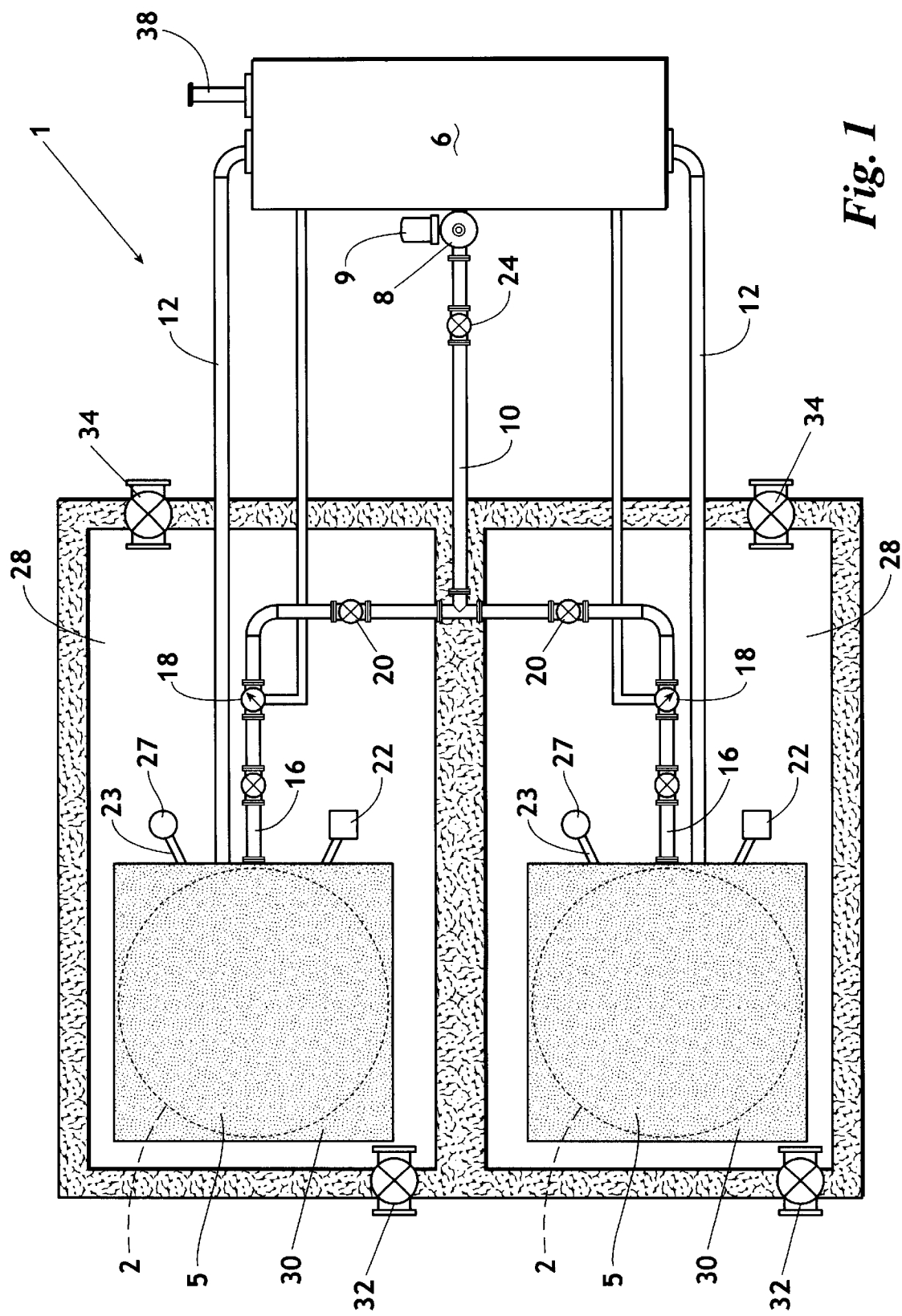
FIG. 1 provides a schematic plan view of an embodiment 1 of the inventive power generation system.
Figure 3:
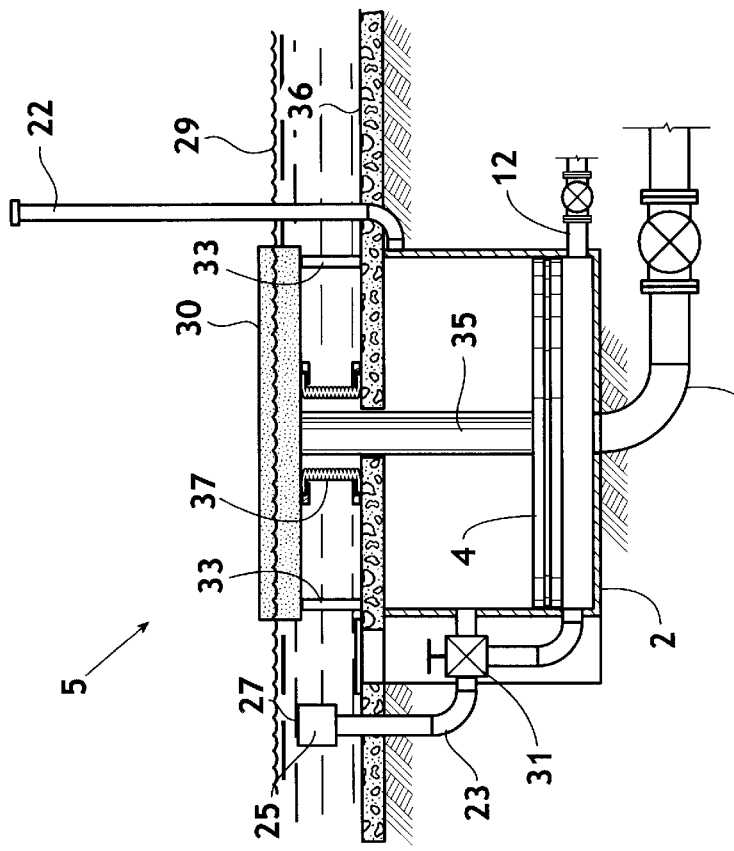
FIG. 3 provides a second schematic, elevational side view of pressurization assembly 5.
Figure 2:
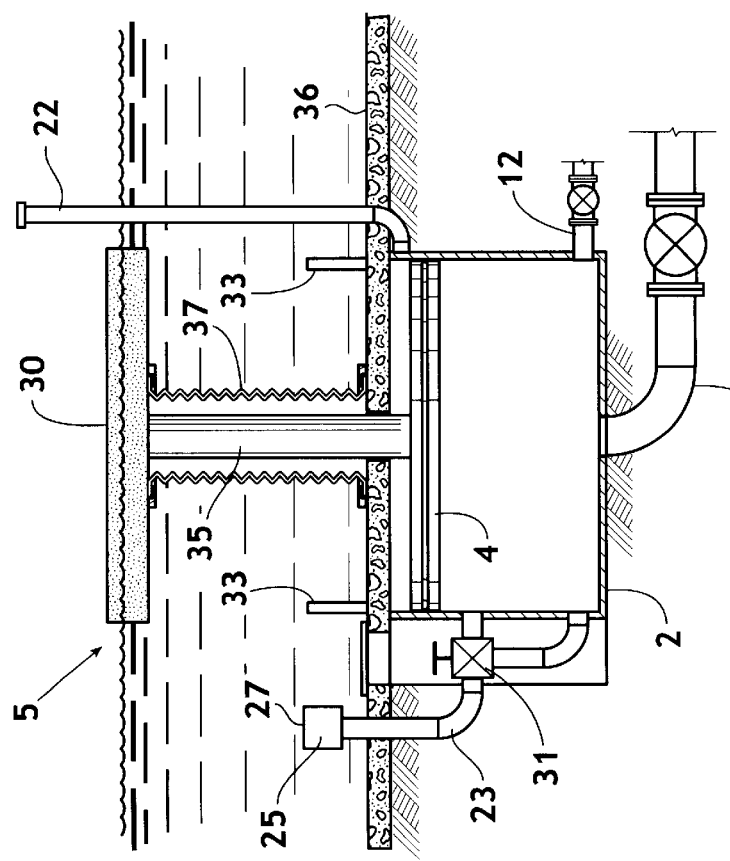
FIG. 2 provides a schematic, elevational side view of a pressurization assembly 5 employed in the present invention.

An embodiment 1 of the inventive power generation system is schematically depicted in FIGS. 1–3. Inventive system 1 includes: one or more (preferably a plurality of) pressurization assemblies 5, each preferably comprising a drum, cylinder, container, or other type of pressurization chamber 2 and a weighted piston 4 reciprocatingly positioned in the chamber 2 for compressing a fluid therein. It will be understood, however, that other types of pressurization assemblies could also be used.

The inventive system 1 further comprises: a fluid reservoir 6 preferably located at an elevation above the pressurization chambers 2; a fluid (preferably water) turbine 8 and associated electrical generator 9 preferably located downstream of the pressurization assemblies 5 and upstream of fluid reservoir 6; a conduit 10 for delivering pressurized fluid from assemblies 5 through turbine 8 and into reservoir 6; and at least one return conduit 12 for delivering the fluid back to the pressurization chambers 2 from reservoir 6.

When generating electrical power, each of the pressurization assemblies 5 is preferably operated in a cyclical manner comprising the steps of: (a) applying a lifting force to piston 4 such that fluid flows (preferably by gravity and suction) into the assembly chamber 2 from reservoir 6 via conduit 12 and (b) removing the lifting force from piston 4 such that the weighted piston moves downwardly within the chamber 2 and thereby compresses and pressurizes the fluid contained therein. When multiple pressurization assemblies 5 are employed, they will preferably be operated in alternating cycles such that, when the piston 4 of at least one assembly 5 is being lifted to thereby fill the chamber 2 thereof with fluid, at least one other pressurization assembly 5 will be operating in the power cycle to deliver compressed fluid to the turbine 8.

The inventive system 1 depicted in FIG. 1 employs two pressurization assemblies 5, each of which has: a discharge conduit 16 for delivering pressurized fluid from the pressurization chamber 2 to the fluid turbine feed conduit 10; a check valve or similar device 18 in the chamber discharge conduit 16 for preventing back flow from the other pressurization assembly 5; and a shut-off valve 20 located in discharge conduit 16. The shut-off valve 20 will be closed when the assembly is operating in the fill cycle and will be open when the assembly is operating in the power cycle to deliver pressurized fluid to turbine 8.

Each pressurization assembly 5 also includes a vent line or similar device 22 for venting air from the upper portion of pressurization chamber when the chamber is operating in the fill cycle and for allowing air to flow into the upper portion of the chamber 2 when the chamber is operating in the power/discharge cycle.

It will also be understood that, rather than operating as a closed system wherein a motive fluid is continuously recirculated between fluid reservoir 6 and pressurization chamber(s) 2, the inventive system 1 can alternatively be operated as an open system using water or other fluid from an outside source which is drawn into the pressurization chamber(s) 2. Outside water can optionally be received in chamber 2 from a river, stream, or other source using, for example, an intake line 23. The upper inlet end 25 of intake line 23 will preferably have a filter 27 thereon and will preferably be positioned so as to always remain below the level 29 of the source fluid. A valve 31 is provided in intake line 23 for selectively placing the open intake system in operation. Check valves or other appropriate structures will also be provided to prevent back flow. In addition, a drain line 38 having a valve therein (not shown) can be provided for simply draining the motive fluid after it passes through turbine 8, rather than returning the fluid to the pressurization assemblies.

It is preferable, however, that the inventive system 1 be operated as a closed system utilizing a clean, isolated motive fluid which is continuously recirculated between the pressurization chamber(s) 2 and the fluid reservoir 6. In this regard, generally any fluid can be used in the closed system. The fluid will preferably comprise or consist of water. If desired or necessary, antifreeze, corrosion inhibitors, and/or other additives can be included in the closed fluid system.

Although generally any type of fluid turbine can be used, examples of water turbines 8 preferred for use in the inventive system are Pelton and Kaplan type turbines. The turbine 8 employed in the inventive system will most preferably be a Pelton turbine.

Inventive system 1 also preferably comprises a control valve 24 provided in conduit 10 upstream of turbine 8 and a flow nozzle (illustrated, for example, as element 165 in FIG. 6) provided in conduit 10 at the inlet of turbine 8. Control valve 24 controls and optimizes the rate of flow and the pressure of the fluid delivered from the pressurization assemblies 5 to turbine 8. The flow nozzle also assists in optimizing the rate, location, type, and pattern of flow into turbine 8 for efficient power production. As will be understood by those skilled in the art, the flow nozzle will preferably comprise a Betasso needle valve.

As depicted in FIGS. 1–3, each of the pressurization assemblies 5 is preferably positioned within a container, barrier, housing, or other type of controlled impoundment area 28. Each of pressurization assemblies 5 also includes a float or other type of buoyancy device 30 which is attached to, is linked to, or otherwise extends from the piston 4. The buoyancy device 30 lifts the piston 4 within the pressurization chamber 2 in response to a rising liquid level within the impoundment area 28.

If desired, the pressurization chambers 2 can be positioned underground or otherwise located beneath the controlled impoundment areas 28. In this arrangement, as illustrated in FIGS. 2 and 3, only the buoyancy devices 30, vents 22, and optional intake lines 23 of the pressurization assemblies 5 are positioned in or extend through the impoundment areas 28.

As will be understood by those skilled in the art, O-rings and other types of seals can be used at the top of the pressurization chamber 2 to prevent fluid, dirt, and other materials from flowing or seeping into the upper portion of the pressurization chamber 2. Fluid, dirt, and other foreign substances will preferably be prevented from entering the top of the pressurization chamber 5 using a flexible sheath 37. Sheath 37 is positioned around the rod 35 connecting the buoyancy device 30 to the piston 4 and is sealingly attached to the bottom of buoyancy device 30 and to the floor 36 of impoundment area 28.

As will also be understood by those skilled in the art, O-rings or other types of seals can be used around the pistons 4 within the pressurization chambers 2 to prevent motive fluid from escaping around the pistons.

Each of the impoundment areas 28 preferably includes an inlet 32 for receiving a lifting fluid to create a rising level of the lifting fluid in the area 28. This rising level raises the buoyancy device 30 to thus lift the piston 4 within the chamber 2. Each impoundment area 28 also includes an outlet 34 for draining the impoundment area sufficiently to release the lifting force provided by buoyancy device 30 and allow the weighted piston 4 to compress the power fluid in the lower portion of chamber 2. Supports 33 are also preferably provided on the floors 36 of the impoundment areas 28 for supporting the buoyancy devices 30 at positions above floors 36 corresponding to the desired final downstroke positions of the pistons 4.

The inlet 32 and outlet 34 of the impoundment area 28 will preferably each comprise a valve, gate, or similar device which can be used to control the pattern of flow into and out of the impoundment areas. Thus, as opposed to the erratic up and down movement provided by ocean waves, tides, surf, and storms, the buoyancy devices 30 of the inventive system 1 will experience consistent, controlled fill and drainage cycles. In addition, when multiple impoundment areas 28 and pressurization assemblies 5 are used, the impoundment area fill cycles can be alternated or staggered to further assist in providing a more constant, uniform flow of power fluid from the various pressurization assemblies 5 through the turbine 8.

Although the inventive system 1 as depicted in FIG. 1 comprises only two impoundment areas 28, each having a single pressurization assembly 5 associated therewith, it will be understood that any number of impoundment areas 28 and pressurization assemblies 5 can be used and that each individual impoundment area 28 can have one or a plurality of pressurization assemblies 5.

Water or other fluid can be pumped or otherwise delivered into impoundment areas 28 using generally any method or device desired. However, the lifting fluid will preferably be delivered into and drained from the impoundment areas 28 by gravitational flow. In this regard, the inventive system 1 will preferably be positioned in or with respect to a waterway (e.g., a stream, river, canal, a natural bypass channel, or a man-made bypass channel) or other source of lifting fluid such that a sufficient gradient is provided to allow the lifting fluid to flow from the source into the impoundment areas 28. The lifting fluid will also preferably flow by gravity out of the impoundment areas 28 during the drainage cycle.

Figure 6:
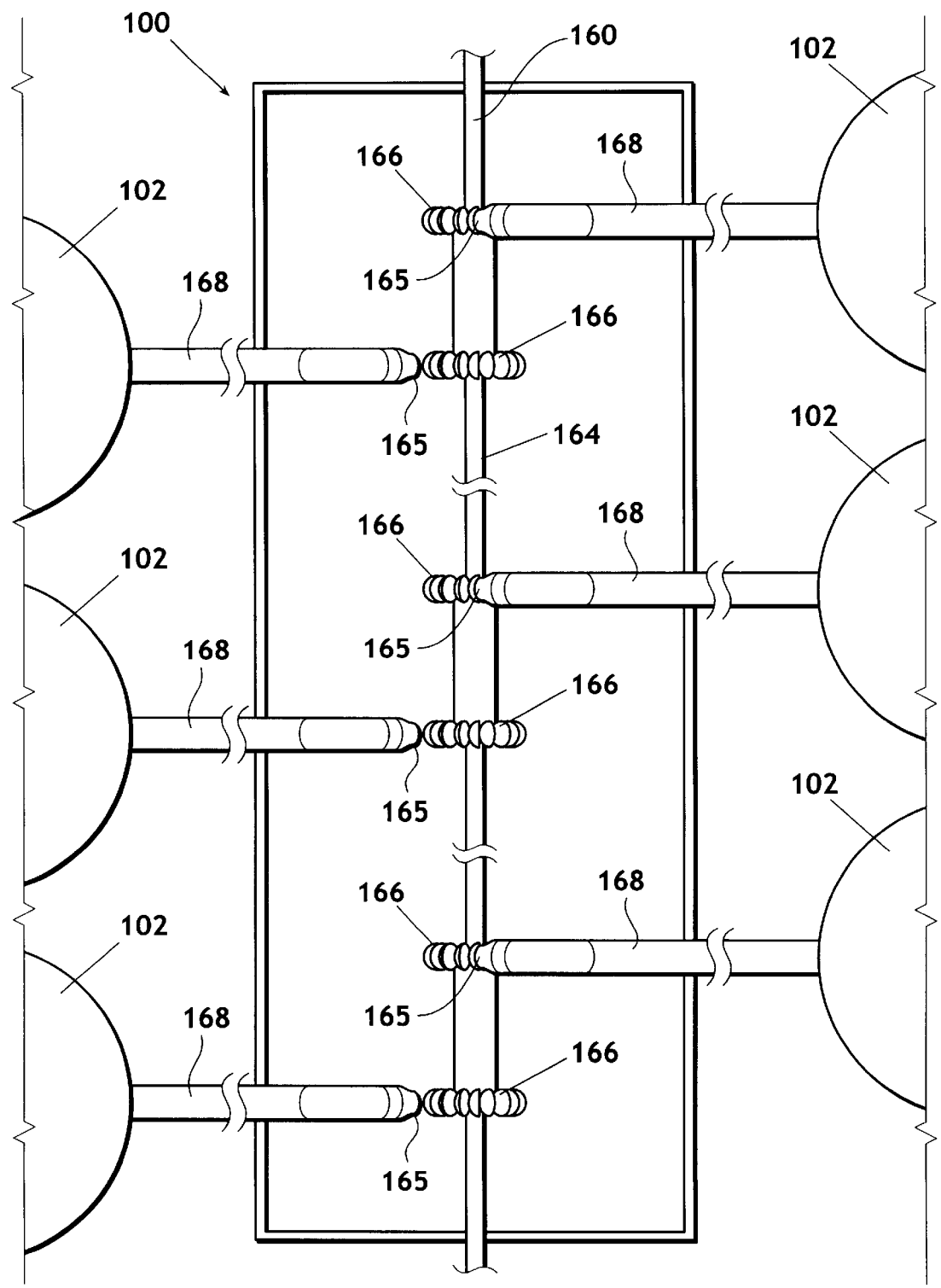
FIG. 6 schematically illustrates a turbine and reservoir assembly employed in inventive power generation system 100.

An alternative embodiment 100 of the inventive system is depicted in FIGS. 4–6. As with embodiment 1, embodiment 100 comprises: a plurality of pressurization assemblies 102, each preferably including a pressurization chamber, a weighted piston, and a buoyancy device as described above; a power turbine 160; a fluid reservoir 162; and a plurality of impoundment areas 106, 107, 108, 109, 110, and 111. Pairs of the impoundment areas 106–111 are preferably positioned along a downward gradient or are otherwise located at successively lower elevations.

Inventive system 100 differs from inventive system 1 in that the impoundment areas 106–111 are located within a waterway 124 (e.g., in a bypass, stream, or river). In addition, pairs of the impoundment areas 106–111 of inventive system 100 are arranged in series and the inlets and outlets thereof preferably comprise a series of gates 114, 116, 118, and 120. The impoundment areas can thus be operated in a manner similar to a series of locks.

An example of a gate 114–120 suitable for use in inventive system 100 is depicted in FIG. 5. The gate comprises a wall 123 which blocks the waterway and has one or a plurality of sliding doors 125 therein. In inventive system 100, the doors 125 of gates 116, 118, and 120 are preferably spaced above the bottom of the wall 123 so that, when the doors 125 are pulled up or otherwise opened to drain the particular impoundment area upstream of the gate, sufficient water is left in the bottom of the upstream impoundment area to support fish or other aquatic life which happens to have found its way into inventive system 100 and to permit unimpeded migration of these creatures through the system.

As further illustrated in FIG. 4, each of impoundment areas 106–111 preferably includes at least one pressurization assembly 102. The pressurization chambers of the assemblies 102 are preferably positioned below ground, in the same manner as depicted in FIGS. 2 and 3, so as to maximize the available depth of the impoundment areas and thus reduce the overall flow gradient required to operate the inventive system.

In the particular embodiment depicted in FIG. 4, system 100 is positioned in a bypass 124. If needed, a short retaining wall 126 can be positioned across the primary stream, river, or other water source 128 to enable a portion of the stream to be delivered into bypass 124. The remainder of the stream flows over the retaining wall 126 and continues down primary waterway 128.

The pressurization assemblies 102 within the first impoundment areas 106 and 107 are operated in the fill cycle by closing gate 116 and opening gate 114. After raising the buoyancy devices of pressurization assemblies 102 sufficiently to begin the power cycle, inlet gate 114 is closed and gate 116 is opened. The water within the first impoundment areas 106 and 107 thus drains into the second impoundment areas 108 and 109 so that the pressurization assemblies 102 in areas 108 and 109 are operated in the fill cycle. This drainage into the second impoundment areas 108 and 109 also places the pressurization assemblies in the first impoundment areas 106 and 107 in the power cycle.

Next, gates 116 and 120 can be closed and gates 114 and 118 opened so that the pressurization assemblies 102 in impoundment areas 106, 107, 110, and 111 will operate in the fill cycle while the assemblies in impoundment areas 108 and 109 operate in the power cycle. Subsequently, gates 118 and 114 can be closed and gates 116 and 120 opened so that the pressurization assemblies in impoundment areas 106, 107, 110, and 111 operate in the power cycle while the assemblies in impoundment areas 108 and 109 operate in the fill cycle.

This process can be continued so that the pressurization assemblies in impoundment areas 106, 107, 110, and 111 operate together in alternating fill and power cycles with the assemblies in impoundment areas 108 and 109. It will be understood, however, that the gates 114–120 can be operated in generally any desired manner to change the timing or pattern of the operational cycles.

If inventive system 100 is used in conjunction with a dam, waterfall, or other such man-made or natural feature or structure having a lengthy and/or extreme flow gradient, it will be apparent that an enormous number of serially connected impoundment areas can be used. If, however, it is desired to use the inventive system 100 in a location where very little natural flow gradient is available, sufficient inlet level and flow can be provided, for example, by simply adding a relatively short retaining wall 126, as discussed above, upstream of inventive system 100.

In cases where there is little flow gradient, a drainage assembly 144 can also optionally be installed at the downstream end of inventive system 100. The drainage assembly 144 preferably comprises: a non-gated containment wall 146 and a below ground drainage pipe 148 having a drainage inlet 150 located in the bottom of the drainage containment area 152. The buried drainage pipe 148 extends a sufficient distance downstream to reach an outlet point 154 where the relative elevation of the waterway has dropped sufficiently to permit drainage to occur.

If there is little or no elevational difference between the sequential impoundment areas 106–111, short stand pipes 170 can also be provided in the bottoms of the impoundment areas to assist the draining process. The stand pipes 170 will have appropriate valves therein which are operated in conjunction with gates 114–120. The stand pipes 170 will drain into underground lines 172 and 174. Lines 172 and 174, in turn, will drain into drainage assembly 144.

As indicated above, generally any type of power turbine can be used in inventive system 100. A Pelton turbine assembly 160 preferred for use in inventive system 100 is depicted in FIG. 6. Pelton turbine assembly 160 preferably comprises: a tank or other reservoir 162 for receiving and recirculating motive fluid back to pressurization assemblies 102; an elongate turbine shaft 164 extending through and rotatably mounted in tank 162; a plurality of Pelton split cup rotors 166 mounted along the length of shaft 164; conduits 168 for delivering pressurized motive fluid from the pressurization assemblies 102 to the turbine rotors 166; and a plurality of flow nozzles 165 (preferably Betasso needle valves) for directing the pressurized motive fluid from the individual pressurized fluid conduits onto separate rotors 166.

The tank 162 having the turbine rotors 166 therein can be installed at generally any desired location but will preferably be located as close to pressurization assemblies 102 as possible in order to minimize frictional pressure losses in the conduits 168. In inventive system 100, an elongate tank 162 having the turbine shaft 164 rotatably mounted therein extends longitudinally through the impoundment areas 106–111.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An apparatus for producing energy comprising:

an impoundment area having an inlet and being positioned with respect to a source of a lifting fluid to receive said lifting fluid from said source through said inlet such that a rising level of said lifting fluid is provided in said impoundment area and said impoundment area having an outlet for removing said lifting fluid to provide a decreasing level of said lifting fluid in said impoundment area and at least one pressurization assembly having a buoyancy device positioned in said impoundment area such that said buoyancy device will rise with said rising level and cause a motive fluid to flow into said pressurization assembly and said buoyancy device will move downwardly with said decreasing level to cause said motive fluid to be pressurized in said pressurization assembly.

2. The apparatus of claim 1 further comprising:

a turbine; and means for delivering said motive fluid pressurized by said pressurization assembly to said turbine.

3. The apparatus of claim 1 wherein said inlet is a flow gate.

4. The apparatus of claim 1 wherein said impoundment area is a first impoundment area and said apparatus further comprises:

a second impoundment area positioned with respect to said first impoundment area to receive said lifting fluid removed from said first impoundment area via said outlet to provide a rising level of said lifting fluid in said second impoundment area, said second impoundment area also including an outlet for removing said lifting fluid to provide a decreasing level of said lifting fluid in said second impoundment area and at least one second pressurization assembly having a buoyancy device positioned in said second impoundment area such that said buoyancy device of said second pressurization assembly will rise with said rising level in said second impoundment area and cause said motive fluid to flow into said second pressurization assembly and said buoyancy device of said second pressurization assembly will move downwardly with said decreasing level in said second impoundment area to cause said motive fluid to be pressurized in said second pressurization assembly.

5. The apparatus of claim 4 further comprising:

a turbine; and means for delivering said motive fluid pressurized in each of said first and said second pressurization assemblies to said turbine.

6. The apparatus of claim 5 wherein said turbine is a Pelton turbine.

7. The apparatus of claim 4 wherein:

said inlet of said first impoundment area is a flow gate and said outlet of said first impoundment area is a flow gate.

8. The apparatus of claim 4 further comprising:

a turbine assembly including a rotatable shaft having a plurality of rotors thereon and conduits extending from said first and said second pressurization assemblies for delivering pressurized motive fluid to said rotors.

9. The apparatus of claim 8 wherein said rotatable shaft is mounted within a fluid reservoir.

10. The apparatus of claim 9 wherein said fluid reservoir is located at an elevation above said first and said second pressurization assemblies.

11. The apparatus of claim 4 further comprising:

a containment area positioned with respect to said second impoundment area to receive said lifting fluid removed from said second impoundment area via said outlet of said second impoundment area and a drainage conduit extending from said containment area.

12. A method of generating power comprising the steps of:

(a) positioning an impoundment area having an inlet with respect to a water source such that, when said inlet is opened, water will flow from said water source into said impoundment area, said impoundment area having at least one buoyancy device positioned therein and extending from a pressurization assembly in a manner so that a rising water level in said impoundment area will raise said buoyancy device and cause a motive fluid to flow into said pressurization assembly and a decreasing water level in said impoundment area will cause said motive fluid to be pressurized in said pressurization assembly, said impoundment area also having an outlet;

(b) opening said inlet to cause said rising water level in said impoundment area and to cause said motive fluid to be received in said pressurization assembly; and (c) opening said outlet to cause said decreasing water level in said impoundment area and to cause said motive fluid to be pressurized in said pressurization assembly.

13. The method of claim 12 further comprising the step of (d) delivering said motive fluid pressurized in said pressurization assembly to a fluid turbine.

14. The method of claim 13 wherein:

said impoundment area is a first impoundment area and said pressurization assembly is a first pressurization assembly;

step (a) further includes positioning a second impoundment area with respect to said first impoundment area such that, when said outlet is opened in step (c), water will flow from said first impoundment area into said second impoundment area, said second impoundment area having a second impoundment area outlet and said second impoundment area also having at least one buoyancy device positioned therein and extending from a second pressurization assembly in a manner so that a rising water level in said second impoundment area will cause said motive fluid to be received in said second pressurization assembly and a decreasing water level in said second impoundment area will cause said motive fluid to be pressurized in said second pressurization assembly; and said method further comprises the steps of:

(e) closing said second impoundment area outlet in step (c) to cause said increasing water level in said second impoundment area and to cause said motive fluid to be received in said second pressurization assembly and then, (f) opening said second impoundment area outlet to cause said decreasing water level in said second impoundment area and to cause said motive fluid to be pressurized in said second pressurization assembly, and (g) delivering said motive fluid pressurized in said second pressurization assembly to said fluid turbine.

15. The method of claim 14 wherein said inlet, said outlet of said first impoundment area, and said second impoundment area outlet comprise flow gates.

16. The method of claim 14 wherein:

said fluid turbine comprises a rotatable shaft having a plurality of rotors thereon, said motive fluid pressurized in said first pressurization assembly is delivered in step (d) to a first one of said rotors, and said motive fluid pressurized in said second pressurization assembly is delivered in step (g) to a second one of said rotors different from said first one of said rotors.

17. The method of claim 16 wherein:

said rotatable shaft having said rotors thereon is rotatably mounted in a reservoir which receives said motive fluid delivered to said power turbine in steps (d) and (g);

said motive fluid is received in said first pressurization assembly in step (d) from said reservoir; and said motive fluid is received in said second pressurization assembly in step (e) from said reservoir.

18. The method of claim 17 wherein said reservoir is positioned at an elevation above said first and said second pressurization assemblies.

19. The method of claim 12 wherein said inlet and said outlet comprise flow gates.

20. The method of claim 19 wherein said water source is a waterway.

* * * * *